United States Patent
Lanne et al.

(10) Patent No.: US 6,792,168 B2
(45) Date of Patent: Sep. 14, 2004

(54) DEVICE FOR COMPENSATING POLARIZATION DISPERSION IN AN OPTICAL TRANSMISSION SYSTEM

(75) Inventors: Stéphanie Lanne, Paris (FR); Jean-Pierre Hamaide, Germain les Arpajon (FR); Denis Penninckx, Nozay (FR)

(73) Assignee: Alcatel, Paris (FR)

( * ) Notice: Subject to any disclaimer, the term of this patent is extended or adjusted under 35 U.S.C. 154(b) by 247 days.

(21) Appl. No.: 10/206,962

(22) Filed: Jul. 30, 2002

(65) Prior Publication Data

US 2003/0039426 A1 Feb. 27, 2003

(30) Foreign Application Priority Data

Aug. 27, 2001 (FR) .............................. 01 11133

(51) Int. Cl.⁷ .......................... G02B 6/126; H04B 10/18
(52) U.S. Cl. .......................... 385/11; 398/150; 398/159
(58) Field of Search .............................. 398/147, 150, 398/159, 195, 213; 385/11

(56) References Cited

U.S. PATENT DOCUMENTS 5,473,457 A * 12/1995 Ono .......................... 398/185
6,317,240 B1 * 11/2001 Penninckx et al. ......... 398/147
6,690,889 B2 * 2/2004 Desthieux et al. .......... 398/147
6,728,491 B1 * 4/2004 Ooi et al. ................... 398/147

FOREIGN PATENT DOCUMENTS

| EP | 0 853 395 A1 | 7/1988 |
| EP | 1 100 217 A2 | 5/2001 |
| EP | 1 109 338 A2 | 6/2001 |

* cited by examiner

*Primary Examiner*—Akm Enayet Ullah
*Assistant Examiner*—Jerry T Rahll
(74) *Attorney, Agent, or Firm*—Sughrue Mion, PLLC

(57) ABSTRACT

A device for compensating the polarization dispersion suffered by an optical signal when it is transmitted by an optical line includes a polarization controller. It generates a differential time delay between two orthogonal polarization modes and controls the polarization controller so that it converts the signal transmitted by the line into a compensated optical signal. If the quality of the compensated optical signal remains below a reference quality the device modifies the state of polarization of the optical signal. Applications include long distance optical transmission via standard fibers.

10 Claims, 3 Drawing Sheets

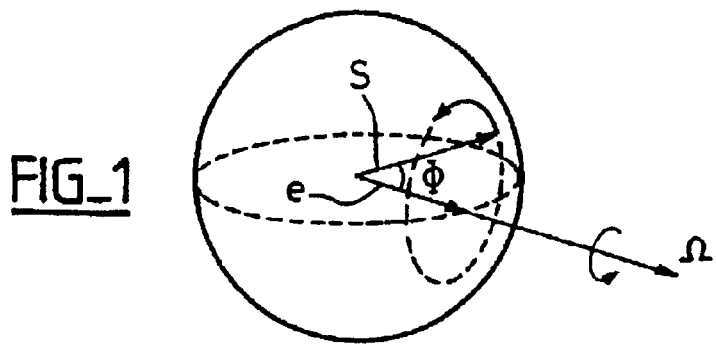
FIG_1
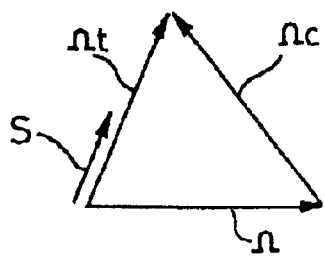
FIG_2
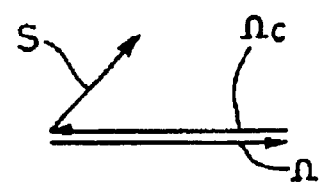
FIG_3
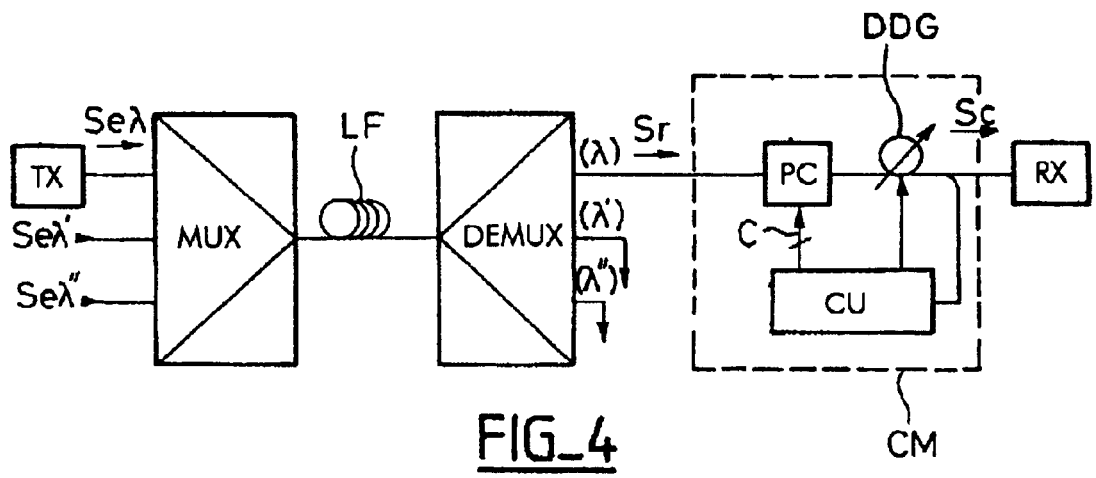
FIG_4

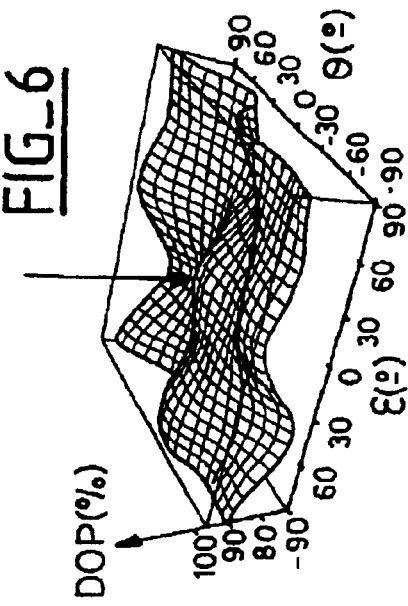# FIG_5
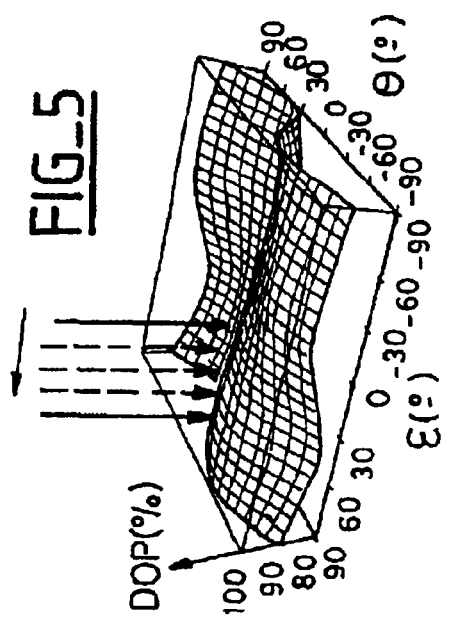# FIG_6
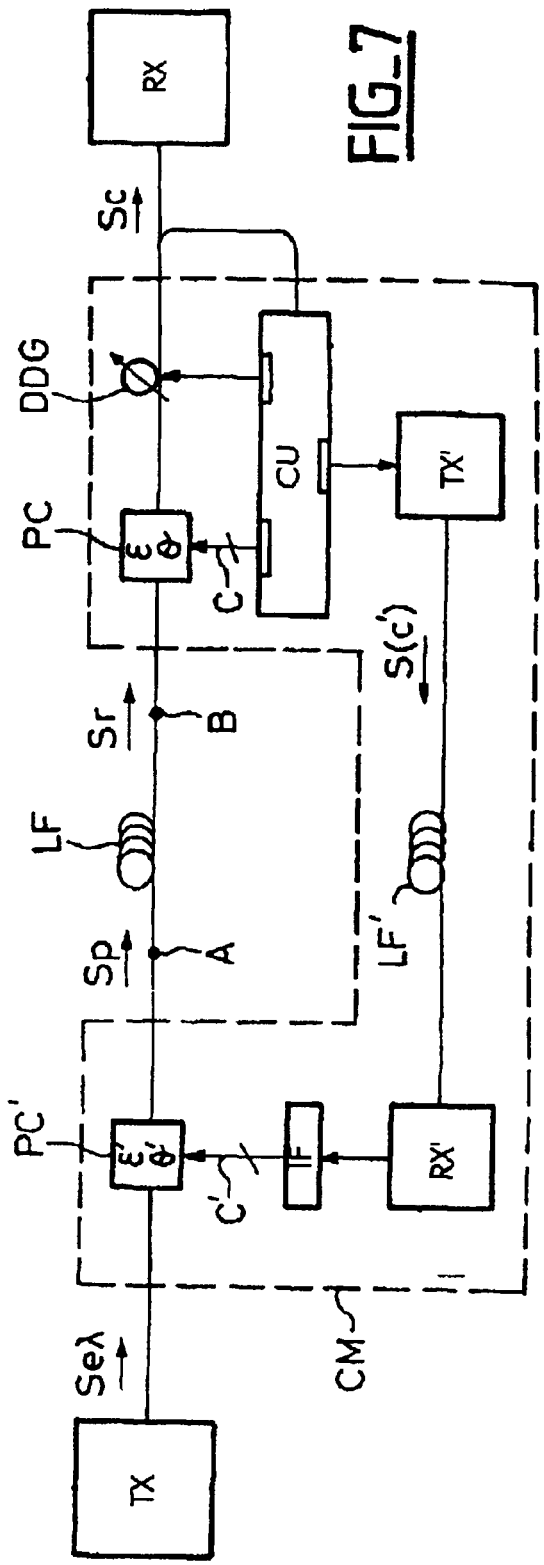# FIG_7

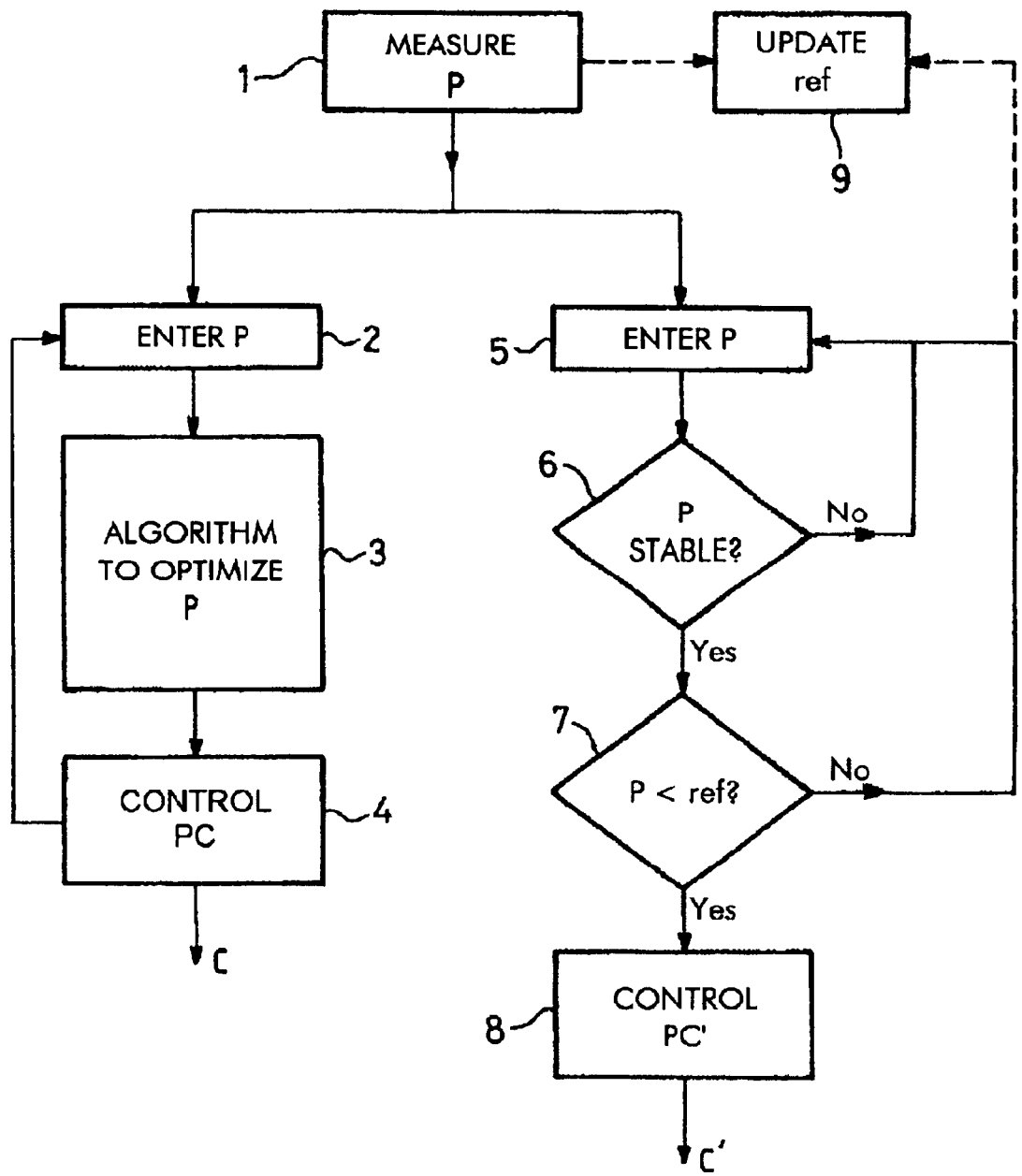
FIG_8

DEVICE FOR COMPENSATING POLARIZATION DISPERSION IN AN OPTICAL TRANSMISSION SYSTEM

CROSS-REFERENCE TO RELATED APPLICATIONS

This application is based on French Patent Application No. 01 11 133 filed Aug. 27, 2001, the disclosure of which is hereby incorporated by reference thereto in its entirety, and the priority of which is hereby claimed under 35 U.S.C. §119.

BACKGROUND OF THE INVENTION

1. Field of the invention

The invention relates to transmission of signals by optical means and relates more particularly to transmission at high bit rates on long distance lines using optical fibers.

The invention relates to a device for dynamically compensating at least some of the polarization dispersion that is observed in optical fiber transmission systems.

2. Description of the prior art

An optical fiber transmission system typically includes:
a transmitter terminal which modulates the power and/or optical frequency of a polarized optical carrier wave as a function of information to be transmitted,
an optical transmission line including a section of monomode fiber for routing the signal transmitted by the transmitter terminal, and
a receiver terminal which receives the optical signal transmitted by the fiber.

The performance of an optical transmission system, in particular in terms of signal quality and bit rate, is limited among other things by the optical properties of the line, which is subject to physical phenomena that degrade the optical signals. Means have been proposed for at least partly remedying the degradation caused by the phenomena that appeared at first to be the most severe, which include attenuation of the optical power and chromatic dispersion.

Another undesirable phenomenon is polarization mode dispersion. If the lengths of optical transmission lines, and more importantly their bit rates, are to be increased further, this phenomenon is no longer negligible compared to the chromatic dispersion.

Optical fibers are subject to polarization dispersion, one effect of which is that a polarized light pulse transmitted by the transmitter terminal and received after propagating in a fiber is distorted and has a duration greater than its original duration. The distortion is due to the fact that the optical signal is depolarized during transmission because of the birefringence of the fibers. To a first approximation, the signal received at the end of the connecting fiber can be considered to consist of two orthogonal components, one corresponding to a state of polarization for which the propagation speed is a maximum (fastest principal state of polarization) and the other corresponding to a state of polarization for which the speed of propagation is a minimum (slowest principal state of polarization). In other words, a pulse signal received at the end of the connecting fiber can be considered to comprise a first pulse signal polarized with a privileged state of polarization and arriving first and a second pulse signal with a slower speed of propagation and arriving with a time-delay, known as the differential group delay (DGD), which depends among other things on the length of the line. The differential group delay and the two principal states of polarization (PSP) therefore characterize the line.

Consequently, if the transmitter terminal transmits an optical signal consisting of a very short pulse, the optical signal received by the receiver terminal consists of two successive orthogonally polarized pulses having a relative time shift equal to the DGD. As detection by the terminal consists in supplying a measurement in electrical form of the total optical power received, the detected pulse has its duration increased as a function of the DGD. This time-delay can be the order of 50 picoseconds for 100 kilometers of standard fiber. Accordingly, for a binary signal whose bit rate is 10 gigabits per second, the time-delay can be as much as half a bit period, which is not acceptable. The problem is obviously even more critical at higher bit rates.

One important aspect of polarization mode dispersion is that the differential group delay and the principal states of polarization of a line vary in time as a function of many factors, including vibration and temperature. Accordingly, unlike chromatic dispersion, polarization dispersion must be considered a random phenomenon. In particular, the polarization dispersion of a line is characterized by a polarization mode dispersion delay (PMD) defined as the average of the measured DGD values.

To be more precise, it can be shown that the polarization dispersion can be represented by a random rotation vector $\Omega$ in the Poincaré space in which the states of polarization are usually represented by a polarization state vector S, known as the Stokes vector, the end of which is situated on a sphere. FIG. 1 shows the main vectors involved: the state of polarization vector S, the polarization dispersion vector $\Omega$, and the principal states of polarization vector e. $\Phi$ is the angle between S and $\Omega$.

The vectors e and $\Omega$ have the same direction and the following equation applies: $\partial S/\partial \omega = \Omega \otimes S$, where $\omega$ is the angular frequency of the optical wave, the symbol $\otimes$ designating a vector product.

The modulus of $\Omega$ is the value of the group delay difference, i.e. of the propagation time-delay between two waves polarized in accordance with the two principal states of polarization of the line.

One principle of polarization dispersion compensation consists in inserting between the line and the receiver a compensator device which has a differential group delay and principal states of polarization which can be represented in the Poincaré space by a vector $\Omega c$ such that the resultant vector $\Omega t$ obtained from the sum $\Omega + \Omega c$ is at all times parallel to S or zero. These two cases are shown by FIGS. 2 and 3, respectively.

One consequence of the random character of polarization dispersion is that a compensator must be adaptive and include a differential group delay generator DDG (for example a polarization-maintaining fiber) which provides a differential group delay at least equal to the maximum differential delay values to be compensated. In practice the aim of compensation must be for the direction e of the principal states of polarization of the line as a whole (including the compensator) to coincide at all times with the direction of the polarization vector S of the received signal. In other words, the angle $\Phi$ previously defined must be kept as small as possible.

One embodiment of a device for compensating polarization mode dispersion is described in U.S. Pat. No. 6,339,489.

FIG. 4 shows an example of an optical transmission system including the above kind of compensator device.

This system is a wavelength division multiplex system designed to convey a plurality of spectral channels in the form of signals Seλ, Seλ', Seλ" with respective carrier wavelengths λ, λ', λ". Each channel, for example the channel Seλ, comes from a transmitter terminal TX transmitting an optical signal taking the form of amplitude modulation of a polarized carrier wave. The channels are combined in a multiplexer MUX whose output is coupled to an optical transmission line LF. This line is typically an optical fiber, but more generally can include diverse optical components (not shown), such as optical amplifiers on the upstream and/or downstream side of the fiber and/or chromatic dispersion compensators. The line can also be composed of a plurality of sections of fiber with optical amplifiers between them.

The end of the line is connected to a receiver terminal, for example the terminal RX, via a demultiplexer DEMUX whose function is to extract the spectral channel Sr addressed to the receiver RX.

The system includes a device CM between the demultiplexer DEMUX and the receiver RX for compensating polarization dispersion so that the receiver RX receives a compensated optical signal Sc. The device CM includes a polarization controller PC, a generator DDG for generating a compensating differential group delay DGDc between two orthogonal modes of polarization, and a control unit CU for the polarization controller PC.

The control unit CU controls the polarization controller PC so that the value of a measurement parameter p representative of the quality of the compensated optical signal Sc tends toward a maximum or minimum corresponding to a maximum signal quality.

In accordance with a first option described in the aforementioned patent application, the generator DDG generates a fixed differential group delay and consists of a polarization-maintaining fiber (PMF), for example, which has the property of procuring a fixed differential delay with invariable principal states of polarization. In one variant, the generator DDG can be adjustable and also controlled by the control unit CU.

As indicated in the aforementioned patent application, the measurement parameter p can be the degree of polarization (DOP) of the signal Sc. The control system is then designed to maximize this parameter. Other parameters can be employed, such as the spectral width of the modulation of the electrical signal obtained by detection of the optical signal Sc, for example. In this case, the control system is designed to maximize this width. The parameter can also be a weighted product of the preceding two parameters, in other words a parameter of the form $DOP^x \cdot \Delta\omega^y$, where DOP is the degree of polarization, $\Delta\omega$ is the spectral width, and x and y are weighting coefficients optimized for the transmission system concerned.

In practice, the control unit CU includes a computer programmed to execute an optimization algorithm to determine how to control the polarization controller so that the value of the parameter p is maintained at a maximum or a minimum corresponding to the maximum signal quality.

The optimization algorithm is a multidimensional algorithm and controls simultaneously at least two control parameters C of the polarization controller PC which determine a variation of the state of polarization of the optical signals passing through the polarization controller PC, this variation being usually represented by two angles $\epsilon$ and $\theta$.

There are many algorithms of this type, for example an algorithm designed to use the Powell method, as described on pages 412 to 420 of "Numerical Recipes in C" by William H. Press et al, Cambridge University Press, 1994.

To explain the operation of the compensator, the variations of the parameter p, for example the degree of polarization DOP (expressed as a percentage), as a function of the angles $\epsilon$ and $\theta$ (in degrees) can be represented as a surface, as shown in FIG. 5.

During its execution, as a function of successive measurements of the parameter p, the algorithm periodically computes values for the control parameters C of the polarization controller to optimize (i.e. to maximize or minimize) the parameter p. The process is symbolized in FIG. 5 by vertical arrows pointing toward values of the degree of polarization DOP obtained at the end of corresponding successive cycles of computing and updating the control parameters C. In the example shown, starting from a state to which the right-hand arrow points, the state evolves toward the left, to reach a maximum value of the degree of polarization after several cycles.

Analyzing the operation of various transmission systems including this kind of compensator has shown that the polarization controller sometimes stabilizes on states that procure highly imperfect compensation. This is explained by the fact that the function representative of variations in the parameter p as a function of $\epsilon$ and $\theta$ varies with time and can temporarily feature local maxima or minima. FIG. 6 shows this kind of situation. Thus a system can evolve relatively slowly from the state represented in FIG. 5 to that represented in FIG. 6, a consequence of which is that the point of convergence of the optimization algorithm finishes up corresponding to a local maximum of the degree of polarization DOP, whereas an absolute maximum would have been reached with another setting of the polarization controller.

As a result of this the compensation is not optimized, which influences transmission performance, especially as the parameter p can remain locked to a local maximum or minimum for relatively long time periods. These time periods can in fact be highly variable, from the order of a few seconds to a few hours or even a few days. Compared to optimum compensation, the information received under these conditions will clearly have a higher error rate, liable to affect a greater amount of data, especially at high bit rates.

A solution to this problem could be envisaged at the level of the algorithm. In effect, the algorithm can be designed to detect that the parameter p is locked to a local maximum or minimum and in this case to execute a procedure to search for another point of convergence corresponding to another maximum or minimum, this process being repeated until convergence to the absolute maximum or minimum is achieved. This method is not acceptable, however, as the parameter p passes through less favorable values between two successive maxima or minima.

Accordingly, in the light of the preceding observations, an object of the invention is to make polarization dispersion compensation more effective.

SUMMARY OF THE INVENTION

To this end, the invention provides a polarization dispersion compensator for an optical transmission system including an optical transmission line having a sending end for receiving a sent optical signal and a receiving end for supplying a transmitted optical signal, the compensator including:

a first polarization controller adapted to receive the transmitted optical signal, a generator for generating a differential group delay between two orthogonal modes of polarization disposed downstream of the controller to supply a compensated optical signal, and a control unit for controlling the first polarization controller as a function of a measurement parameter representative of the quality of the compensated optical signal and in such a fashion as to optimize the quality, which compensator includes an auxiliary compensator adapted to modify the state of polarization of the sent optical signal if the measurement parameter has a stable value.

This solution represents an improvement because, under the conditions defined above, variations in the state of polarization of the sent signal Sp lead to modifications of the function representative of the variations of the measurement parameter to be optimized as a function of the setting of the first polarization controller, such that this function finishes up by no longer having the local maximum or minimum to which the optimization algorithm has caused the measurement parameter to converge. Accordingly, the parameter p never remains locked for long onto a highly unfavorable local maximum or minimum.

The solution proposed is also made more effective because the optimization algorithm can maintain the parameter continuously in the vicinity of a maximum or minimum. In effect, the modifications of the state of polarization of the sent optical signal are not operative unless the measurement parameter has converged toward a maximum. Accordingly, by providing for relatively slow modification of the state of polarization, the execution of the optimization algorithm is hardly interfered with.

In accordance with one aspect of the invention, to detect if the measurement parameter p has a stable value, the auxiliary compensator is adapted to compare with each other successive values taken by the measurement parameter.

In one embodiment of the invention, the auxiliary compensator is adapted to modify the state of polarization of the sent optical signal if the measurement parameter has a stable value representative of a compensated optical signal quality that is worse than a reference quality.

This embodiment prevents modifications of the state of polarization of the sent optical signal from being operative when the measurement parameter has converged toward an absolute maximum or a local maximum guaranteeing an optimum signal quality or a signal quality deemed to be sufficient.

The reference quality advantageously corresponds to substantially the best quality of the compensated optical signal that can be obtained with the optical transmission system concerned. Thanks to this feature, the state of polarization of the sent optical signal has less chance of being modified if the measurement parameter has converged toward an absolute maximum and it is highly probable that it will be modified if the measurement parameter has converged toward a local maximum.

According to another feature of the invention, for optimum and continuous determination of the reference quality, the reference quality corresponding to a reference value of said measurement parameter, the auxiliary compensator is adapted to compare the stable value of the measurement parameter to the reference value and to update the reference value as a function of maximum and minimum values reached by the measurement parameter.

In practice, the auxiliary compensator generates control parameters of an optical component, such as a polarization controller, which produces the corresponding modifications of the state of polarization of the sent optical signal. Digital control means generally supply these control parameters, the variations in which are therefore inherently discontinuous.

According to other aspects of the invention, each of these variations advantageously leads to a modification of the direction of the state of polarization vector of said sent optical signal of less than 10 degrees and preferably less than 3 degrees.

The invention also provides an optical transmission system incorporating the compensator defined above.

Other aspects and advantages of the invention will become apparent in the course of the description with reference to the drawings.

BRIEF DESCRIPTION OF THE DRAWINGS

FIG. 1 represents the Poincaré space already commented on.

FIGS. 2 and 3 show two principles of polarization dispersion compensation, also already commented on.

FIG. 4 shows diagrammatically an optical transmission system including a compensator conforming to the prior art, also commented on previously.

FIGS. 5 and 6 show functions representative of variations of the degree of polarization DOP as a function of the angles $\epsilon$ and $\theta$ of variation of the state of polarization generated by the polarization controller of a compensator.

FIG. 7 shows diagrammatically an optical transmission system including the compensator according to the invention.

FIG. 8 shows a flowchart explaining the operation of the compensator according to the invention.

DETAILED DESCRIPTION OF THE PREFERRED EMBODIMENT

FIG. 7 shows diagrammatically and by way of example an optical transmission system provided with a compensator according to the invention.

As in the FIG. 4 system, a transmitter terminal TX is coupled to a receiver terminal RX by an optical transmission line LF and a polarization dispersion compensator CM. To simplify the explanation, the system shown comprises only the components associated with one WDM channel.

The compensator CM is inserted between an end B (called the receiving end) of the line LF and the receiver terminal RX. The compensator CM therefore receives from the receive end B the transmitted signal Sr and delivers to the receiver terminal RX the compensated signal Sc.

In accordance with the invention, the compensator CM is further provided with an auxiliary compensator including a second polarization controller PC' inserted between the transmitter terminal TX and the end A (called the transmitting end) of the line LF. The polarization controller PC' therefore receives the optical signal Seλ from the transmitter terminal TX and delivers to the sending end A the sent optical signal Sp.

The second polarization controller PC' applies to the signal Seλ a variation ($\epsilon'$ and $\theta'$) of the state of polarization that is a function of at least two control parameters C' determined by the control unit CU, and transmitted by a control channel. For example, the control channel can use an existing return transmission system consisting of a second transmitter terminal TX', a second transmission line LF', and a second receiver terminal RX'. A control interface IF between the second receiver terminal RX' and the second controller PC' generates control signals for the second controller PC' which materialize the control parameters C' coming from the control unit CU and conveyed by a signal S(C') transmitted by the line LF'.

The operation of the compensator is explained with reference to the FIG. 8 flowchart. The flowchart diagrams the principal operations effected by the control unit CU.

A first operation 1 carries out a sampled measurement in real time and in digital form of the chosen parameter p. As a function of successive measured values 2 of the parameter p, an optimization algorithm 3 periodically calculates values to be assigned to the control parameters C of the first polarization controller PC to optimize (i.e. to maximize or minimize) the parameter p. At the end of each successive computation cycle, a corresponding control signal is fed to the first polarization controller PC (operation 4).

These operations 1 to 4 are part of the operations effected in a main control loop conforming to prior art compensators and therefore do not need to be explained in more detail.

In accordance with the invention, the control unit CU includes an auxiliary control loop effecting supplementary operations 5 to 8 described below.

Using the successive measured values 5 of the parameter p, a calculation module 6 periodically checks if the parameter has reached a stable value, i.e. if execution of the optimization algorithm 3 has caused the parameter to converge toward a maximum or minimum. If so, a test module 7 periodically compares the stable value previously detected to a reference value ref.

When the maximum or minimum just referred to is a maximum, for example, if the stable value is less than the reference value ref, an operation 8 generates a control signal for the second polarization controller PC' to modify the control parameters C' of that controller and consequently to modify the state of polarization variation ($\epsilon'$ and $\theta'$) applied to the signal Sp. This modification is random and of limited amplitude, for example.

In a simplified version, the test module 7 could be eliminated without the compensation becoming totally ineffective.

On the other hand, if the test module 7 is provided, it may be advantageous also to provide an updating module 9 designed to update the reference value ref as a function of maximum or minimum values reached by the measurement parameter p. Accordingly, even if transmission conditions evolve with time, the state of polarization of the sent optical signal is sure to be modified only if the measurement parameter converges toward a local maximum.

The practical implementation of the above functions is open to many variations but will not cause any particular problem to designers of transmission systems. In effect, their implementation uses conventional microcontroller programing techniques.

Accordingly, to check if the measurement parameter p has reached a stable value, the calculation module 6 is programed to compare a number of successive values taken by the parameter with each other, for example, and to determine that a stable value has been reached if the average of the differences between the successive values is below a predetermined threshold.

It is as well at this point to remember that the effectiveness of the compensation is conditioned first of all by the response time of the whole of the main control loop and depends essentially on the speed of execution of the optimization algorithm 3 and the response time of the first polarization controller PC.

The response time of the main control loop must be compatible with the rate at which the PMD fluctuates in practice. Knowing that disturbances can cause the polarization vector S defined previously to perform up to 50 rotations per second, it is possible to deduce the minimum response time to be imposed on the main control loop, according to the required signal quality. In practice, a response time of less than one millisecond is needed, for example.

These constraints lead to the choice of a fast component for the first polarization controller PC, for example a lithium niobate component available off the shelf. On the other hand, these constraints have no effect on the performance required of the second polarization controller PC'. The second controller can therefore be selected from lower cost components (based on liquid crystals, fiber squeezers) having a response time greater than that of the first polarization controller.

Also, the main control loop must offer sufficient precision for the angle $\Phi$ between the direction e of the principal states of polarization of the whole of the line between the sent signal Sp and the compensated signal Sc and the direction of the polarization vector S of the compensated signal Sc to remain at all times below a given value enabling the required improvement in signal quality.

It has been found by trial and error that this angle must generally remain below 10 degrees and preferably below 3 degrees. Thus, as the modifications of the state of polarization variation ($\epsilon'$ and $\theta'$) due to the second polarization controller PC' are triggered by the operation 8 in the form of discontinuous variations of the control parameter C', each of the discontinuous variations must lead to a variation of the angle $\Phi$ less than 10 degrees and preferably less than 3 degrees.

In other words, each discontinuous variation of the control parameter C' must preferably lead to a modification of the direction of the state of polarization vector of the sent optical signal Sp of less than 10 degrees and preferably less than 3 degrees.

Note that triggering successive modifications of the state of polarization variation ($\epsilon'$ and $\theta$) only if the measurement parameter p has reached a stable value automatically ensures that these modifications are operative at a rhythm slower than the response time of the main control loop. This guarantees that the auxiliary control loop interferes with the operation of the main loop in a perfectly controlled fashion.

There is claimed:

1. A polarization dispersion compensator for an optical transmission system including an optical transmission line having a sending end for receiving a sent optical signal and a receiving end for supplying a transmitted optical signal, said compensator including:
    a first polarization controller adapted to receive said transmitted optical signal,
    a generator for generating a differential group delay between two orthogonal modes of polarization disposed downstream of said controller to supply a compensated optical signal, and
    a control unit for controlling said first polarization controller as a function of a measurement parameter representative of the quality of said compensated optical signal and in such a fashion as to optimize said quality,
    which compensator includes an auxiliary compensator adapted to modify the state of polarization of said sent optical signal if said measurement parameter has a stable value.

2. The device claimed in claim 1 wherein said auxiliary compensator is adapted to compare successive values taken by said measurement parameter with each other and thereby to detect if said measurement parameter has a stable value.

3. The device claimed in claim 2 wherein said auxiliary compensator is adapted to modify the state of polarization of said sent optical signal if said measurement parameter has a stable value representative of a quality of said compensated optical signal less than a reference quality.

4. The device claimed in claim 3 wherein said reference quality corresponds substantially to the best quality of said compensated optical signal that can be obtained with said optical transmission system.

5. The device claimed in claim 4 wherein said reference quality corresponds to a reference value of said measurement parameter and said auxiliary compensator is adapted to compare said stable value of said measurement parameter to said reference value and to update said reference value as a function of maximum and minimum values reached by said measurement parameter.

6. The device claimed in claim 1 wherein said auxiliary compensator includes a second polarization controller at the upstream end of said optical transmission line to supply said sent optical signal to said sending end.

7. The compensator claimed in claim 6 wherein said second polarization controller has a response time greater than that of said first polarization controller.

8. The compensator claimed in claim 1 wherein said modifications of said state of polarization of said sent optical signal are the result of variations of control parameters and said variations are discontinuous and such that each of said variations leads to a modification of the direction of the state of polarization vector of said sent optical signal of less than 10 degrees.

9. The compensator claimed in claim 8 wherein each of said variations leads to a modification of the direction of said state of polarization vector of said sent optical signal of less than 3 degrees.

10. An optical transmission system which includes a compensator as claimed in claim 1.

* * * * *